US010853483B2

United States Patent
Ikuse et al.

(10) Patent No.: US 10,853,483 B2
(45) Date of Patent: Dec. 1, 2020

(54) IDENTIFICATION DEVICE, IDENTIFICATION METHOD, AND IDENTIFICATION PROGRAM

(71) Applicant: NIPPON TELEGRAPH AND TELEPHONE CORPORATION, Chiyoda-ku (JP)

(72) Inventors: Tomonori Ikuse, Musashino (JP); Kazufumi Aoki, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 231 days.

(21) Appl. No.: 15/528,875

(22) PCT Filed: Dec. 4, 2015

(86) PCT No.: PCT/JP2015/084215
§ 371 (c)(1),
(2) Date: May 23, 2017

(87) PCT Pub. No.: WO2016/093182
PCT Pub. Date: Jun. 16, 2016

(65) Prior Publication Data
US 2017/0329962 A1    Nov. 16, 2017

(30) Foreign Application Priority Data

Dec. 9, 2014    (JP) .................................. 2014-249119

(51) Int. Cl.
*G06F 21/53*    (2013.01)
*G06F 21/56*    (2013.01)
(Continued)

(52) U.S. Cl.
CPC .............. *G06F 21/53* (2013.01); *G06F 21/56* (2013.01); *H04L 63/14* (2013.01); *H04W 12/1208* (2019.01)

(58) Field of Classification Search
CPC ........ G06F 21/53; G06F 21/56; H04W 12/12; H04L 63/14
See application file for complete search history.

(56) References Cited

U.S. PATENT DOCUMENTS 7,870,610 B1 *   1/2011   Mitchell ................. G06F 21/53
                                                            726/23
7,958,558 B1     6/2011   Leake et al.
(Continued)

FOREIGN PATENT DOCUMENTS

CN   103795679 A   5/2014
CN   103914652 A   7/2014
(Continued)

OTHER PUBLICATIONS

Chia-Mei Chen et al., "Defending Malicious Attacks in Cyber Physical Systems," IEEE, pp. 13-18, 2013 (Year: 2013).*
(Continued)

*Primary Examiner* — Luu T Pham
*Assistant Examiner* — Canh Le
(74) *Attorney, Agent, or Firm* — Oblon, McClelland, Maier & Neustadt, L.L.P.

(57) ABSTRACT

A command server identification device adds a tag to data received by malware upon execution of the malware, the tag capable of uniquely identifying identification information for a transmission source of the data, and tracks propagation of the data added with the tag. The command server identification device acquires a tag of data referenced by a branch instruction executed by the malware, among the tracked data. The command server identification device
(Continued)

analyzes information on an instruction of a branch destination not executed by the malware after the branch instruction. Then, the command server identification device identifies identification information of a command server for issuing a command to the malware from the identification information of the transmission source corresponding to the acquired tag, based on the result of analysis.

5 Claims, 11 Drawing Sheets

(51) Int. Cl.
*H04L 29/06* (2006.01)
*H04W 12/12* (2009.01)

(56) References Cited

U.S. PATENT DOCUMENTS

| | | | |
|---|---|---|---|
| 8,510,827 | B1 | 8/2013 | Leake et al. |
| 2006/0136720 | A1* | 6/2006 | Armstrong ............ G06F 21/53 713/164 |
| 2008/0016339 | A1* | 1/2008 | Shukla ............... G06F 21/566 713/164 |
| 2008/0216175 | A1* | 9/2008 | Pike ..................... G06F 21/52 726/22 |
| 2009/0007100 | A1* | 1/2009 | Field ................... G06F 21/562 718/1 |
| 2013/0024937 | A1* | 1/2013 | Glew ................... G06F 21/577 726/23 |
| 2013/0036464 | A1 | 2/2013 | Glew et al. |
| 2013/0097699 | A1 | 4/2013 | Balupari et al. |
| 2013/0139262 | A1* | 5/2013 | Glew ................. H04L 63/1466 726/23 |
| 2014/0033309 | A1* | 1/2014 | Leake ................. G06F 12/1416 726/23 |
| 2014/0344877 | A1* | 11/2014 | Ohmata ................ H04H 60/14 725/110 |
| 2016/0277441 | A1 | 9/2016 | Glew et al. |
| 2017/0019418 | A1 | 1/2017 | Ikuse et al. |

FOREIGN PATENT DOCUMENTS

| | | |
|---|---|---|
| JP | 2014-219741 A | 11/2014 |
| WO | WO 2014/098239 A1 | 6/2014 |
| WO | 2015/137235 A1 | 9/2015 |

OTHER PUBLICATIONS

Nathan VanHoudnos et al. "This Malware Looks Familiar: Laymen Identify Malware Run-time Similarity with Chernoff faces and Stick Figures," ACM, pp. 1-8, 2017. (Year: 2017).*

Tomonori Ikuse et al. "Identifying C&C Server by Analyzing Relation between Control Flow and Communications", IEICE Technical Report, Mar. 20, 2014, vol. 113, No. 502, 6 pages (with English Abstract).

G. Jacob et al., "Jackstraws: Picking Command and Control Connections from Bot Traffic", In Proceedings of the 20th USENIX Conference on Security, Aug. 12, 2011, 16 pages.

International Search Report dated Mar. 1, 2016 in PCT/JP2015/084215 filed on Dec. 4, 2015.

Combined Chinese Office Action and Search Report dated Aug. 5, 2019 in Chinese Patent Application No. 201580066814.8 (with partial unedited computer generated English translation and English translation of categories of cited documents) citing documents AO and AR therein, 15 pages.

Extended European Search Report dated Apr. 4, 2018 in Patent Application No. 15867444.0 citing references AA-AG therein, 7 pages.

* cited by examiner

FIG.3

| ID | BRANCH INSTRUC-TION | EXECUTION ADDRESS | CALL STACK | BRANCH DESTINATION EXECUTED | BRANCH DESTINATION NOT EXECUTED | TAG AFFECTING DETERMINATION OF BRANCH DESTINATION | API NAME |
|---|---|---|---|---|---|---|---|
| 1 | call | 0x404000 | 0x402000··· | 0x408000 | - | - | - |
| 2 | jcc | 0x408100 | 0x404000··· | 0x40a000 | 0x408106 | 1 | - |
| 3 | jmp | 0x40b000 | 0x404000··· | 0x40c000 | - | - | - |
| 4 | call | 0x40d000 | 0x404000··· | 0x780000 | - | - | CreateFile |
| 5 | ret | 0x790000 | 0x40d000··· | 0x40d005 | - | - | - |
| ⋮ | ⋮ | ⋮ | ⋮ | ⋮ | ⋮ | ⋮ | ⋮ |

| ID | EXECUTION LOG ID | DUMP CONTENT |
|---|---|---|
| 1 | 1 | 0x4550a910934fa0f011··· |
| ... | ... | ... |

FIG.9

| ID | EXECUTION LOG ID | FILE NAME |
|---|---|---|
| 1 | 1 | sample_1 |
| ... | ... | ... |

17

IDENTIFICATION DEVICE, IDENTIFICATION METHOD, AND IDENTIFICATION PROGRAM

FIELD

The present invention relates to an identification device, an identification method, and an identification program.

BACKGROUND

In recent years, malware that creates a threat such as information leakage and unauthorized access is rampant. When measures against such malware are to be taken, it is an ideal to prevent infection itself. However, the way to infect some devices with malware is steadily advanced and diversified, and it is difficult to prevent all malware infections in advance. Therefore, not only measures to prevent malware infection but also measures to minimize damage after infection are required.

Based on such demand for measures after the infection, measures such as detection of infected terminals and communication cut-off using a blacklist are taken. For example, many of malware have a feature of communicating with a command server that transmits an attacker's instruction after the infection and determines a behavior of the malware, and perform information leakage and further infection activity in response to the instruction from the command server. Therefore, if the command server is blacklisted in advance, it is possible to find an infected terminal by detecting communication with the command server and to detoxify the infected terminal by cutting off the communication with the command server. However, these measures require generation of the blacklist beforehand.

Generally, because a communication destination that should be blacklisted can be extracted by analyzing the malware, the blacklist is generated by the malware analysis. However, because the malware communicates not only with the command server but also with legitimate sites for the purpose of analysis disturbance, it is required to extract only the command server among a plurality of communication destinations including the legitimate sites. Therefore, as Non Patent Literature 1 and Non Patent Literature 2, a method focusing on how the command server controls malware has been studied.

Here, there are roughly two methods by which the command server controls malware. One of the methods is to specify arguments of system call and API (Application Programming Interfaces) in addition to program code executed by malware. The other one is to specify only the program code executed by malware.

Therefore, in Non Patent Literature 1, a branch instruction in the program code of malware and an API call sequence executed at a branch destination are focused, and when a predetermined API is called at each branch destination by data received from the same communication destination, this communication destination is identified as a command server. In Non Patent Literature 2, a data transfer relationship between system calls issued in relation to data transmission/reception of malware is focused, and when arguments of the system calls and APIs are specified, the command server is identified.

CITATION LIST

Non Patent Literature

Non Patent Literature 1: Tomonori Ikuse, Kazufumi Aoki, and Takeo Hariu, "Identifying C&C Server by Analyzing Relation between Control Flow and Communications", IEICE Technical Report, ICSS2013-81

Non Patent Literature 2: G. Jacob, R. Hund, C. Kruegel, and T. Holz, "Jackstraws: Picking Command and Control Connections from Bot Traffic", In Proceedings of the 20th USENIX Conference on Security

SUMMARY

Technical Problem

However, in the conventional technologies, there is a problem that it is difficult to identify the command server by receiving only one type of the command that affects only the branch instruction, such as an instruction to specify the program code executed by the malware.

For example, in the control method of specifying only a program code to be executed, the data received from the command server affects only the branch instruction, and is not used as arguments of the system call and API. Therefore, in the method described in Non Patent Literature 2, there is a possibility that the command server is missed when only the program code executed by malware is specified. On the other hand, in the method described in Non Patent Literature 1, because it focuses on the branch instruction, any control method can cope with it. However, because the legitimate site may sometimes affect the branch instruction, it is necessary to receive two or more types of commands that affect only the branch instruction in order to accurately detect the command server.

The present invention has been made to solve the conventional technological problems, and an object of the present invention is to provide an identification device, an identification method, and an identification program capable of identifying a command server even if only one type of command that affects only a branch instruction is received.

Solution to Problem

An identification device includes: a tracking unit that adds a tag to data received by malware upon execution of the malware, the tag capable of uniquely identifying identification information for a transmission source of the data, and that tracks propagation of the data added with the tag; a monitoring unit that acquires a tag of data referenced by a branch instruction executed by the malware, among data tracked by the tracking unit; an analyzing unit that analyzes information on an instruction of a branch destination not executed by the malware after the branch instruction; and an identifying unit that identifies identification information of a command server for issuing a command to the malware from the identification information of the transmission source corresponding to the tag acquired by the monitoring unit, based on an analysis result of the analyzing unit.

An identification method executed by an identification device, the identification method includes: a tracking process of adding a tag to data received by malware upon execution of the malware, the tag capable of uniquely identifying identification information for a transmission source of the data, and of tracking propagation of the data added with the tag; a monitoring process of acquiring a tag of data referenced by a branch instruction executed by the malware, among data tracked in the tracking process; an analyzing process of analyzing information on an instruction of a branch destination not executed by the malware after the branch instruction; and an identifying process of identifying identification information of a command server for issuing a command to the malware from the identification information of the transmission source corresponding to the tag acquired in the monitoring process, based on an analysis result of the analyzing process.

An identification program for causing a computer to execute: a tracking step of adding a tag to data received by malware upon execution of the malware, the tag capable of uniquely identifying identification information for a transmission source of the data, and of tracking propagation of the data added with the tag; a monitoring step of acquiring a tag of data referenced by a branch instruction executed by the malware, among data tracked at the tracking step; an analyzing step of analyzing information on an instruction of a branch destination not executed by the malware after the branch instruction; and an identifying step of identifying identification information of a command server for issuing a command to the malware from the identification information of the transmission source corresponding to the tag acquired at the monitoring step, based on an analysis result of the analyzing step.

Advantageous Effects of Invention

The identification device, the identification method, and the identification program disclosed in the present application can identify a command server even if only one type of command that affects only a branch instruction is received.

BRIEF DESCRIPTION OF DRAWINGS

FIG. 3 is a diagram illustrating an example of information stored by an execution trace DB according to the first embodiment.

FIG. 4 is a diagram illustrating an example of information stored by a memory dump DB according to the first embodiment.

FIG. 9 is a diagram illustrating an example of information stored by a runtime state DB according to the second embodiment.

DESCRIPTION OF EMBODIMENTS

In the following embodiments, the configuration and the flow of processing of the command server identification device according to the first embodiment will be explained in order, and then advantageous effects of the first embodiment will be explained at the end.

First Embodiment

Figure 1:
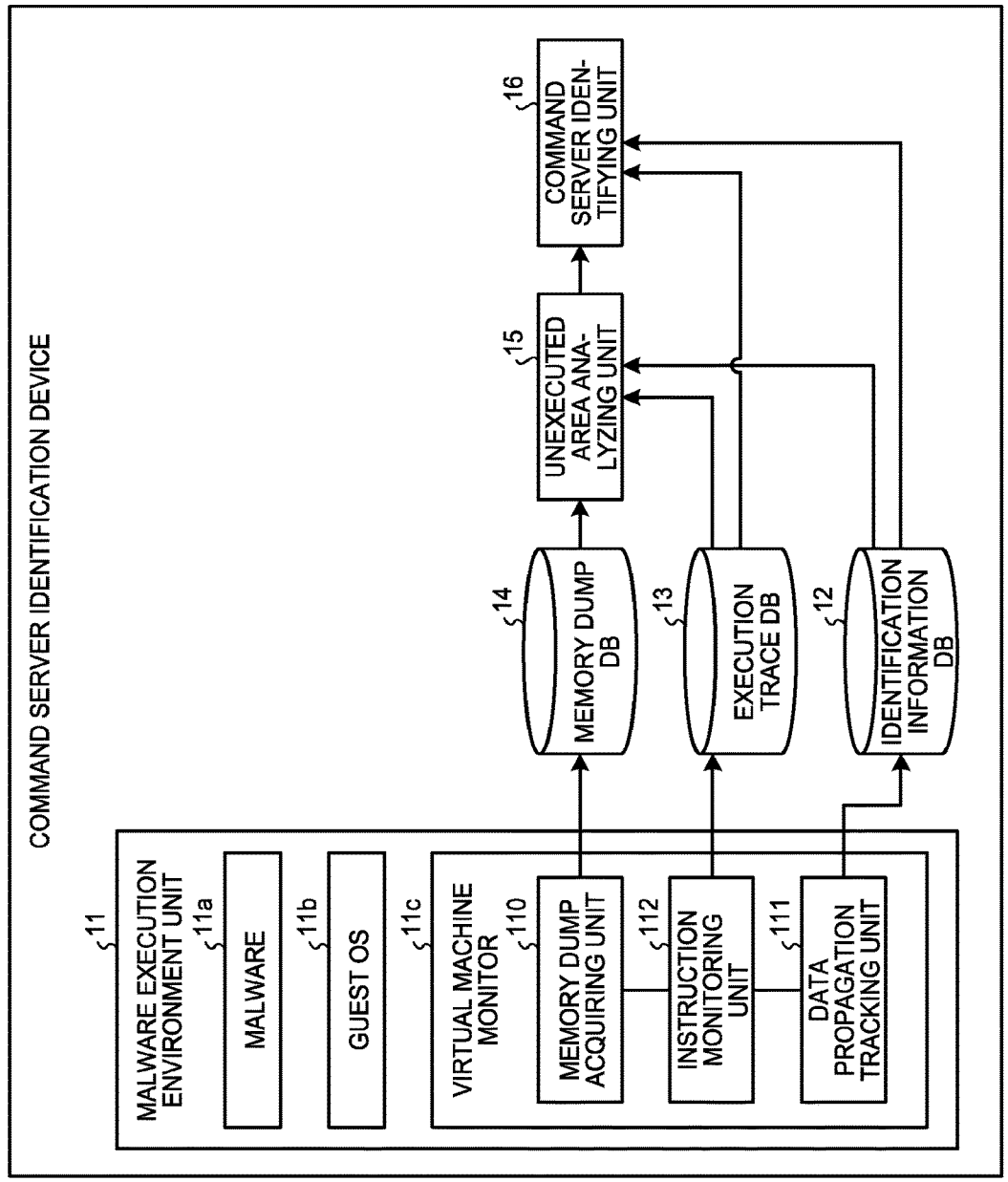
FIG. 1 is a block diagram illustrating an overview of a command server identification device according to a first embodiment.

First of all, a configuration of a command server identification device 10 will be explained with reference to FIG. 1. FIG. 1 is a block diagram illustrating an overview of the command server identification device according to a first embodiment. As illustrated in FIG. 1, the command server identification device 10 includes a malware execution environment unit 11, an identification information DB (Data Base) 12, an execution trace DB 13, a memory dump DB 14, an unexecuted area analyzing unit 15, and a command server identifying unit 16. The processing of each unit will be explained below.

The malware execution environment unit 11 includes a malware 11a, a guest OS (operating System) 11b, and a virtual machine monitor 11c, and analyzes the malware while actually running it. The malware 11a is a malicious program that poses a threat such as information leakage and unauthorized access, and is executed on the guest OS 11b as a program to be analyzed. The guest OS 11b is an environment for dynamically analyzing the malware 11a.

The virtual machine monitor 11c includes a memory dump acquiring unit 110, a data propagation tracking unit 111, and an instruction monitoring unit 112, and monitors the behavior when malware is executed. For example, the virtual machine monitor 11c constructs a virtual machine including a virtual CPU (Central Processing Unit) and a virtual memory on the guest OS 11b, causes the virtual machine to execute the malware 11a, and monitors its behavior.

The memory dump acquiring unit 110 acquires a memory dump in order to monitor the behavior of the malware 11a and registers the memory dump in the memory dump DB 14. For example, the memory dump acquiring unit 110 acquires the content of a virtual memory provided in the virtual machine when the virtual machine executes the malware 11a, and records the acquired content in the memory dump DB 14.

The data propagation tracking unit 111 sets a tag for the data received by the malware 11a, the tag being capable of uniquely identifying its transmission source and which the received data is, and tracks the propagation of the data during execution of the malware 11a by taint analysis.

Here, the taint analysis technology is one of methods to automate data flow analysis, and is a technology of tracking propagation of data within an analysis system by setting a tag for the data and propagating the tag according to a propagation rule. The tag is attribute information added to the data, in which the origin and type of data are set. The propagation rule is a condition for propagating tags, and copying and computation of the data are generally set as a condition for propagation.

For example, when analyzing the usage of the received data, the data propagation tracking unit 111 sets a tag that can uniquely identify an acquisition source in the received data and propagates the tag according to the copying and computation of the data. As a result, by checking that the tag is set in the data passed as the argument of the API, the command server identification device 10 can analyze that the received data is data used as the argument of the API. It is common that the taint analysis technology is realized by using virtual computer technology, and the tag is stored in a dedicated recording area different from that of the data so as to be associated with the data.

Explaining an example of processing executed by the data propagation tracking unit 111, the data propagation tracking unit 111 sets the tag capable of uniquely identifying the transmission source in the data received by the malware 11a, records the tag corresponding to the identification information indicating the transmission source of the data such as IP (Internet Protocol) address, FQDN (Fully Qualified Domain Name), and URL (Uniform Resource Locator) in the identification information DB 12, and then tracks data propagation on the virtual machine monitor 11c. Moreover, when the data is received from a plurality of transmission sources to generate new data, the data propagation tracking unit 111 generates a new tag capable of uniquely identifying the identification information for the transmission sources, adds the tag to the data, and tracks the propagation of the data added with the tag. In addition, when the received data is referenced in the function, the data propagation tracking unit 111 adds a tag to a return value of the function and tracks the propagation of the data added with the tag.

The instruction monitoring unit 112 calls, among branch instructions executed by program codes of the malware 11a, a branch instruction and an API that refer to the data added with the tag indicating that it is the data received by the malware 11a, and records a call stack or the like when these are called, as logs, in the execution trace DB 13. Specifically, the instruction monitoring unit 112 acquires API call executed by the malware 11a, issue of a system call, branch instructions such as jmp instruction, jcc instruction, call instruction, and ret instruction, a call stack when an instruction is executed, and a tag of the data referenced by the branch instruction, and records the acquired data in the execution trace DB 13. That is, the instruction monitoring unit 112 acquires the tag of the data referenced by the branch instruction executed by the malware 11a and records the acquired tag in the execution trace DB 13.

Figure 2:
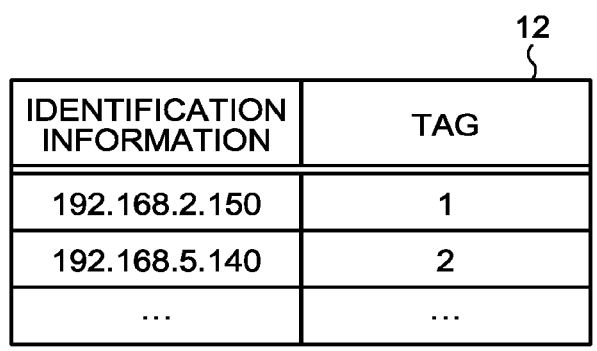
FIG. 2 is a diagram illustrating an example of information stored by an identification information DB according to the first embodiment.

The identification information DB 12 stores the identification information of communication generated when the malware is executed and the tag set in the received data received from the communication destination indicated by the identification information in association with each other. For example, FIG. 2 is a diagram illustrating an example of information stored by the identification information DB according to the first embodiment. As illustrated in FIG. 2, the identification information DB 12 stores the identification information and the tag added to the received data received from the communication destination indicated by the identification information in association with each other.

For example, in the example illustrated in FIG. 2, the tag corresponding to an IP address "192.168.2.150" as the identification information is "1", and the tag corresponding to an IP address "192.168.2.140" as the identification information is "2". In this way, by storing the communication destination and the tag in association with each other, the identification information DB 12 recognizes the acquisition source by checking the tag set in the data.

The tag registered in the identification information DB 12 is set by, for example, the data propagation tracking unit 111, but the granularity for setting the tag may be arbitrarily set according to the granularity of the identification information for the finally identified command server. For example, the data propagation tracking unit 111 may change the tag corresponding to the received data for each FQDN and URL, or may change the tag for each session in consideration of a port number. However, as illustrated in FIG. 2, the data propagation tracking unit 111 sets the tag capable of uniquely identifying the transmission source.

Returning to FIG. 1, the execution trace DB 13 stores the log acquired by the instruction monitoring unit 112. For example, FIG. 3 is a diagram illustrating an example of information stored by the execution trace DB according to the first embodiment. In the execution trace DB 13, ID (IDentifier) for identifying the log, the branch instruction executed during analysis by the malware, the execution address where the branch instruction is executed, the call stack at the time of execution, the branch destination executed, the branch destination not executed, the tag that affects the determination of the branch destination, and the API name are recorded. Here, the API name is information recorded when the branch destination is the API. Moreover, the tag that affects the determination of the branch destination and the branch destination not executed are information recorded only when these are present.

Referring back to FIG. 1, the memory dump DB 14 records the memory dump acquired by the memory dump acquiring unit 110 during execution of the malware 11a. For example, FIG. 4 is a diagram illustrating an example of information stored by the memory dump DB according to the first embodiment. In the example illustrated in FIG. 4, the memory dump DB 14 records an ID for identifying the memory dump, an execution log ID, and a dump content in association with each other. Here, the execution log ID is an ID of the log registered in the execution trace DB 13 as information indicating a location where the memory dump is acquired. The dump content is a memory dump acquired by the memory dump acquiring unit 110. Thereby, the memory dump as a target to be analyzed at the time of analyzing the unexecuted area can be identified in the memory dump DB 14.

Returning to FIG. 1, the unexecuted area analyzing unit 15 analyzes the information related to the instruction of the branch destination not executed by the malware 11a after the branch instruction executed by the malware 11a. Specifically, the unexecuted area analyzing unit 15 statically analyzes the program code of the branch destination not executed by the malware 11a based on the information stored in the identification information DB 12, the execution trace DB 13, and the memory dump DB 14. By analyzing the control structure that is a structure of instructions and processing at the branch destination not executed by the malware 11a, the unexecuted area analyzing unit 15 identifies the junction between the branch destination executed by the malware 11a and the branch destination not executed by the malware 11a.

Figure 5:
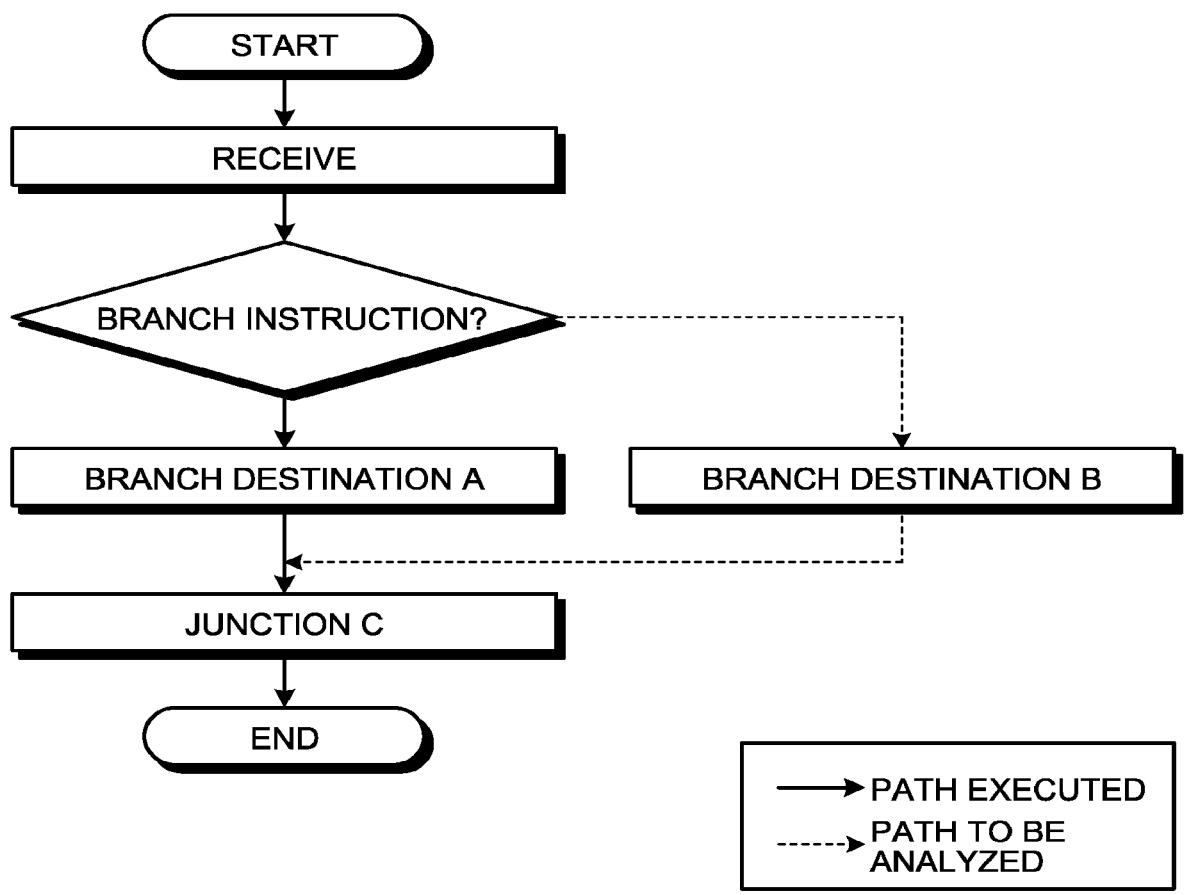
FIG. 5 is a flowchart illustrating an example of a control structure analyzed by an unexecuted area analyzing unit according to the first embodiment.

Here, FIG. 5 is a flowchart illustrating an example of the control structure analyzed by the unexecuted area analyzing unit 15 according to the first embodiment. The example illustrated in FIG. 5 represents the control structure when the processing executed by the malware 11a is branched into a branch destination A and a branch destination B by the branch instruction for changing a branch destination by the data received from an external server and then the branches join together at a junction C. In the case illustrated in FIG. 5, when only the branch destination A is executed at the time of dynamically analyzing the malware, the unexecuted area analyzing unit 15 identifies the range of the branch destination B executed by the malware 11a by identifying the junction C between the branch destination B not executed by the malware 11a and the branch destination A.

The processing executed by the unexecuted area analyzing unit 15 will be specifically explained next. For example, the unexecuted area analyzing unit 15 refers to the execution trace DB 13, identifies the branch instruction that the received data affects the determination of a branch destination, and determines whether the malware 11a executes each branch destination of the identified branch instruction. At this time, each branch instruction is identified in consideration of the call stack and the value of execution address (value of instruction pointer register). Then, about the identified branch instruction, when the execution log which is the log when each branch destination is executed can be checked from the execution trace DB 13, the unexecuted area analyzing unit 15 ends the processing for the identified branch instruction assuming that there is no unexecuted area.

On the other hand, when there is a branch destination not executed, the unexecuted area analyzing unit 15 uses the memory dump recorded at the time of executing the malware 11a to statically analyze the API called at the unexecuted branch destination and the control structure of the branch destination. For example, the unexecuted area analyzing unit 15 performs static analysis to disassemble the data of the memory dump. As a specific algorithm for disassembling, a known linear sweep algorithm or recursive algorithm is used.

The unexecuted area analyzing unit 15 identifies the API called at the unexecuted branch destination by checking it against information for a module loaded during dynamic analysis of the branch destination executed by the malware 11a, its export address table, a called address, and an import address table as a target to be analyzed. However, the unexecuted area analyzing unit 15 may monitor the unexecuted area by using a known method of monitoring API calls which gives resistance to analysis interference by applying the taint analysis. Thereafter, the unexecuted area analyzing unit 15 notifies the command server identifying unit 16 of the identified API and control structure as a result of analysis.

In the present embodiment, because the static analysis is used, when a called party cannot be identified, such as when a called address is dynamically determined, the unexecuted area analyzing unit 15 identifies only the API call that can be identified, as API executed at the branch destination, and notifies the command server identifying unit 16 to that effect. Also, for the control structure, the unexecuted area analyzing unit 15 does not consider the instruction whose branch destination is unknown.

The command server identifying unit 16 identifies a command server based on the analysis result of the unexecuted area analyzing unit 15 and the information stored in the execution trace DB 13 and the identification information DB 12. Specifically, the command server identifying unit 16 identifies the identification information of the command server that issues a command to the malware 11a, from the identification information of the transmission source corresponding to the tag acquired by the instruction monitoring unit 112 based on the analysis result of the unexecuted area analyzing unit 15.

For example, the command server identifying unit 16 receives the API called in the unexecuted area, which is a branch destination not executed by the malware 11a, and the control structure of the unexecuted area from the unexecuted area analyzing unit 15. The command server identifying unit 16 reads the execution log stored by the execution trace DB 13 and the information stored by the identification information DB 12. Thereafter, the command server identifying unit 16 checks whether all the branch instructions that the received data affects the determination of the branch destinations are applied to next conditions. That is, the command server identifying unit 16 identifies the API called between a branch point and the junction when the junction is present beyond the branches of the branch instruction and identifies the API called before reaching the end point when the junction is not present, and determines whether a predetermined API or a predetermined API string is included in the identified API.

When a predetermined API or a predetermined API string is included in the identified API, the command server identifying unit 16 identifies the command server by acquiring the tag of the data referenced at the time of branching, from the execution trace DB 13, and then acquiring the communication destination tied to the tag from the identification information DB 12. In other words, of the branch destinations of a certain branch instruction, when the predetermined API or the predetermined API string is called at the branch destination not executed by the malware 11a, the command server identifying unit 16 determines the transmission source of the data affected on the branch instruction as the command server.

The predetermined API is an API, which should be noted in malware analysis, that the malware preferably calls in general, and is separately prepared as a list, so that it is possible to check the API whether it is the predetermined API by checking it against the list. The predetermined API string is an order of APIs, which should be noted in the malware analysis, that the malware executes after reception of a command from the command server.

Here, assuming that, for example, a file read instruction comes from the command server, an API string is set in the predetermined API string, in the order of an API for opening a file within the terminal, an API for reading data in the file, and an API for transmitting the read data to an external server. Moreover, assuming that, for example, a file write instruction comes from the command server, an API string is set in the predetermined API string, in the order of an API for opening a file within the terminal, an API for searching for data in the file, an API for writing the data in the file, and an API for closing the file.

These predetermined APIs and API strings can be investigated by prior malware analysis and listed. The API and API string to be checked may be limited according to calculation resource operated by the API, or may be limited by the API called by the previously analyzed malware 11a. In order to improve detection accuracy, only the API called at the time of dynamic analysis for determination of the command server and API call sequence may be targets to be detected.

When a predetermined system call is included in the system call called in the unexecuted area or when the predetermined system calls are called in the predetermined order, the command server identifying unit 16 may determine the transmission source corresponding to the tag of the data referenced by the branch instruction as the command server. Moreover, the command server identifying unit 16 may determine the command server based on both the called API and system call.

The command server identifying unit 16 identifies the command server based on the API and the system call etc. called at the branch destination executed by the malware 11a in addition to the processing. For example, for the branch instruction where the API call and the issuing of the system call are performed at a plurality of branch destinations, when the identification information corresponding to the tag of the data referenced at the time of branching is common to that at the branch destinations, the command server identifying unit 16 identifies the identification information as identification information of the command server.

For example, by analyzing the API call and the issuing of the system call executed by the malware 11a stored in the execution trace DB 13, and the information of the branch instruction and call stack, the command server identifying unit 16 extracts the branch instruction where the API call and the issuing of the system call are performed at the branch destinations, and acquires the tag of the data referenced when branching the processing into the branch destinations where the API call and the issuing of the system call are performed, from the execution trace DB 13.

Furthermore, by acquiring the communication destination corresponding to the tag from the identification information DB 12, the command server identifying unit 16 acquires the communication destination that affects the branch instruction for each branch destination, and determines the communication destination that is common between the branch destinations as the command server. In other words, the command server identifying unit 16 identifies the command server by dynamically analyzing the malware 11a, statically analyzes the branch destination not executed by the malware 11a for each branch instruction, and determines, when the predetermined API and API string are called as a result of static analysis, the transmission source of the data that affects the branch instruction as a target to be processed, as the command server.

By analyzing the unexecuted area, the junction between the branches becomes clear, and as a result, it is considered that the predetermined API string is called only in the side executed during dynamic analysis. Also in this case, the command server identifying unit 16 can identify the command server based on the API string called by the malware 11a.

The command server identifying unit 16 may identify the command server from the branch destination executed by the malware 11a by using other known method. For example, when the predetermined API or system call is called at the branch destination executed by the malware 11a, the command server identifying unit 16 may determine the transmission source of the data that affects the branch instruction as a target to be processed, as the command server.

In this way, the command server identification device 10 tracks the propagation after the tag is added to the received data at the time of execution of the malware 11a, calls the API executed by the malware 11a, monitors and acquires the branch instruction, the call stack at the time of executing the instruction, and the tag set in the data referenced by the branch instruction. The command server identification device 10 identifies the command server in the branch instruction in which the branch destination is determined by the received data, based on API or API string called at the branch destination not executed by the malware 11a and based on the control structure.

Here, when the command server controls the malware 11a, also in any instruction of the method for specifying a system call and an argument of the API in addition to the program code and of the method for specifying only the program code to be executed, the program code to be executed is specified by affecting the branch instruction. Therefore, the command server identification device 10 can determine whether the communication destination can actually control the malware by checking called API or API string or the like, thus identifying the communication destination as the command server.

By paying attention to the received data that affects the branch instruction, its acquisition source, and to the API or API string called at the branch destination, the command server identification device 10 can identify the command server, and by checking the API string at the branch destinations, its accuracy increases. That is, the command server identification device 10 analyzes also the branch destination of the unexecuted area, and can therefore identify the command server even when only one type of command instructing only switching of the program code to be executed is received.

The command server identified by the command server identification device 10 is registered in the blacklist for command servers in which known malicious IP addresses, URLs, etc. are listed. By registering the identification information such as the IP address of the command server in the blacklist, it is possible to block the communication with the command server, and to find and isolate the infected terminal.

Processing Performed by Command Server Identification Device

Figure 6:
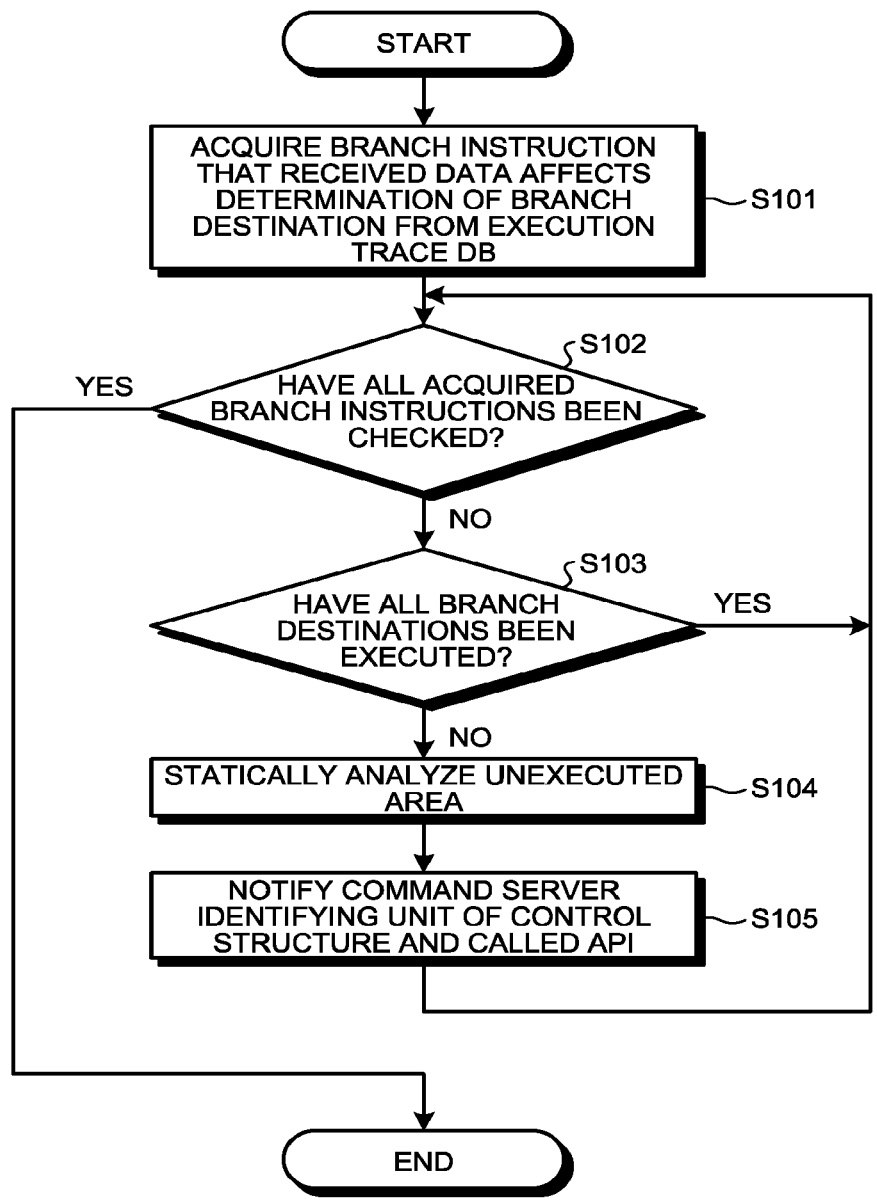
FIG. 6 is a flowchart illustrating a flow of processing for static analysis of an unexecuted area by the command server identification device according to the first embodiment.
Figure 7:
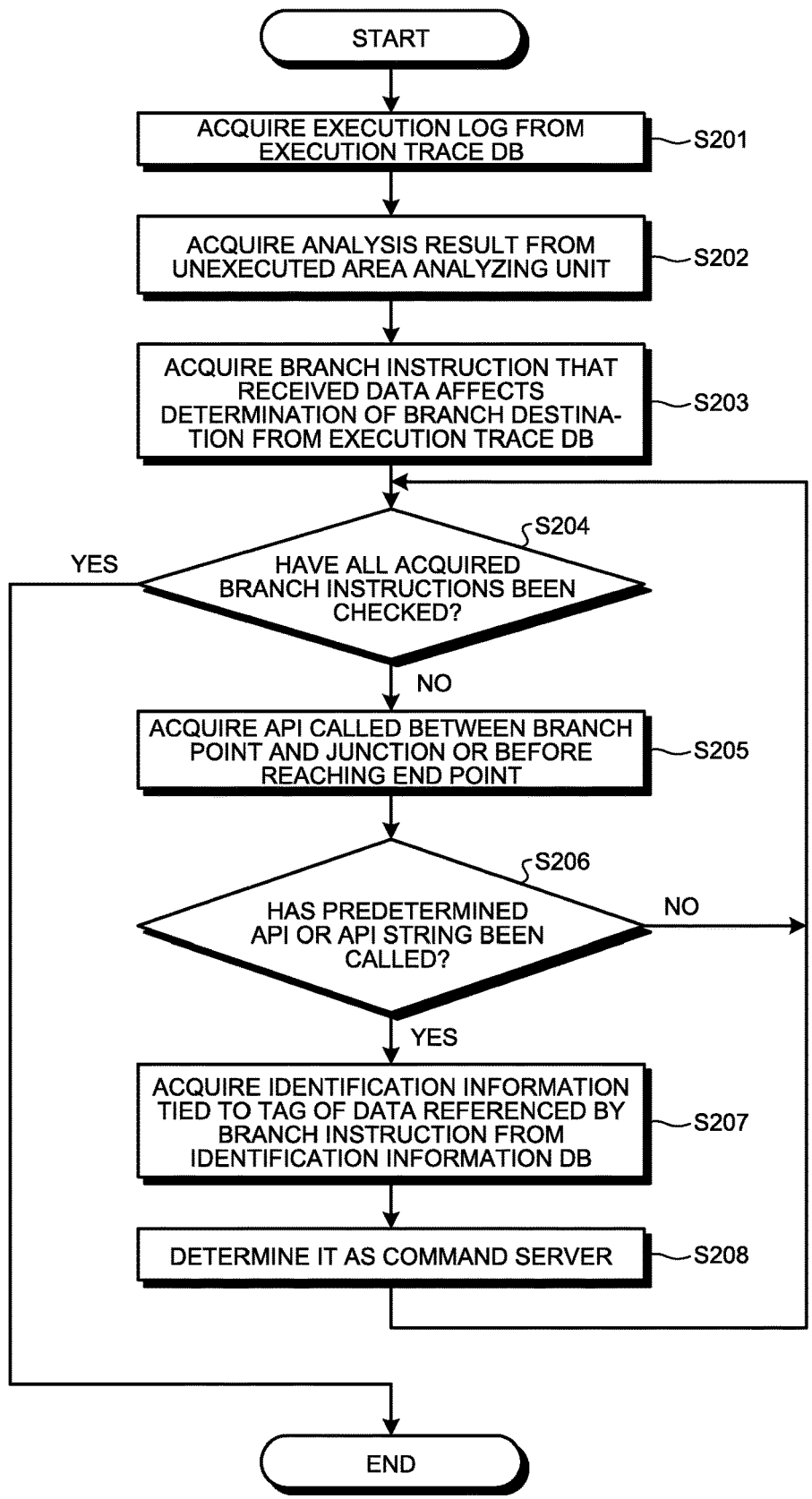
FIG. 7 is a flowchart illustrating a flow of identification processing of a command server by the command server identification device according to the first embodiment.

The processing performed by the command server identification device 10 according to the first embodiment will be explained next with reference to FIG. 6 and FIG. 7. FIG. 6 is a flowchart illustrating a flow of processing for static analysis of an unexecuted area by the command server identification device according to the first embodiment. FIG. 7 is a flowchart illustrating a flow of identification processing of a command server by the command server identification device according to the first embodiment.

First of all, the flow of analysis processing of an unexecuted area by the unexecuted area analyzing unit 15 of the command server identification device 10 according to the first embodiment will be explained below. As illustrated in FIG. 6, the unexecuted area analyzing unit 15 acquires a branch instruction that the received data affects the determination of the branch destination, from the execution trace DB 13 (Step S101). Subsequently, the unexecuted area analyzing unit 15 determines whether all acquired branch instructions have been checked (Step S102), and determines, when they have not been checked (No at Step S102), whether all the branch destinations have been executed (Step S103).

When all the branch destinations have not been executed (No at Step S103), that is, when there is an unexecuted area, the unexecuted area analyzing unit 15 statically analyzes the unexecuted area (Step S104). Subsequently, the unexecuted area analyzing unit 15 notifies the command server identifying unit 16 of the identified control structure and of the API called in the unexecuted area as a result of static analysis (Step S105), and executes again Step S102. Meanwhile, when all the branch destinations have been executed (Yes at Step S103), the unexecuted area analyzing unit 15 executes again Step S102. When all the acquired branch instructions have been checked (Yes at Step S102), the unexecuted area analyzing unit 15 ends the processing.

Then, the flow of identification processing of a command server by the command server identification device 10 according to the first embodiment will be explained below. As illustrated in FIG. 7, the command server identifying unit 16 acquires an execution log from the execution trace DB 13 (Step S201). Subsequently, the command server identifying unit 16 acquires an analysis result from the unexecuted area analyzing unit 15 (Step S202). Then, the command server identifying unit 16 acquires a branch instruction that the received data affects the determination of the branch destination, from the execution trace DB 13 (Step S203).

The command server identifying unit 16 determines whether all the acquired branch instructions have been checked (Step S204), and executes the following processing for the branch instructions that have not been checked when they have not been checked (No at Step S204). In other words, the command server identifying unit 16 acquires an API called between the branch point and the junction or before reaching the end point of the processing executed by the program, that is, acquires an API called in the unexecuted area (Step S205). The command server identifying unit 16 then determines whether the predetermined API or API string has been called by the acquired API (Step S206). When it has been called (Yes at Step S206), the command server identifying unit 16 acquires the identification information tied to the tag of the data referenced by the branch instruction as a target to be processed from the identification information DB 12 (Step S207).

Thereafter, the command server identifying unit 16 determines the communication destination indicated by the acquired identification information as the command server (Step S208), and executes again Step S204. Meanwhile, when the predetermined API or API string has not been called by the acquired API (No at Step S206), the command server identifying unit 16 executes again Step S204. When all the acquired branch instructions have been checked (Yes at Step S204), the command server identifying unit 16 ends the processing.

Advantageous Effects of First Embodiment

As explained above, the command server identification device 10 adds the tag capable of uniquely identifying identification information for a data transmission source to the data received by the malware 11a, and tracks the propagation of the data added with the tag. Moreover, the command server identification device 10 acquires the tag of the data, of the tracked data, referenced by the branch instruction executed by the malware 11a. The command server identification device 10 analyzes the information on the instruction of the branch destination not executed by the malware 11a after the branch instruction, and identifies identification information of the command server that issues a command to the malware 11a from the identification information for the transmission source corresponding to the acquired tag based on the analysis result.

Therefore, even when receiving only one type of command that affects only the branch instruction, the command server identification device 10 can identify the command server. In addition, the command server identification device 10 can automatically identify the command server when the communication content of malware is obfuscated or encrypted.

The command server identification device 10 analyzes at least one of the API and the system call called by the malware 11a at the branch destination not executed by the malware 11a after the branch instruction. Then, when the predetermined API is called at the branch destination not executed by the malware 11a after the branch instruction or when the predetermined system call is called, the command server identification device 10 determines the identification information for the transmission source corresponding to the tag of the data referenced by the branch instruction as the identification information of the command server. Therefore, the command server identification device 10 can identify the command server of the malware 11a that calls the predetermined API and system call.

When the predetermined APIs are called in a predetermined order at the branch destination not executed by the malware 11a after the branch instruction or when the predetermined system calls are called in a predetermined order, the command server identification device 10 determines the identification information for the transmission source corresponding to the tag of the data referenced by the branch instruction as the identification information of the command server. Therefore, the command server identification device 10 can identify the command server of the malware 11a that calls the predetermined APIs and system calls in the predetermined order.

By analyzing the control structure of the branch destination not executed by the malware, the command server identification device 10 identifies a junction between the branch destination executed by the malware and the branch destination not executed by the malware, and identifies the identification information for the command server that issues the command to the malware based on the analysis result of the information on instructions from the branch instruction to the junction. Therefore, the command server identification device 10 can accurately identify the command server of the malware 11a.

The command server identification device 10 acquires the content of a memory when the malware 11a is executed, and uses the acquired content of the memory to statically analyze the information on the instruction of the branch destination not executed by the malware 11a after the branch instruction. Therefore, the command server identification device 10 does not have to execute the malware 11a many times in order to analyze the branch destinations, which makes it possible to reduce the processing load of the analysis.

Second Embodiment

In the first embodiment, the command server identification device 10 statically analyzes the unexecuted area and identifies the command server based on the API and the system call called in the unexecuted area. However, the embodiments are not limited thereto. For example, by dynamically analyzing the unexecuted area, the command server identification device 10 may analyze the API and the system call called in the unexecuted area, and the control structure of the unexecuted area. When the processing is executed, the command server identification device 10 can analyze the API, the system call, and the control structure at the branch destination even in situations that the analysis is difficult only by the static analysis such as when the called party is dynamically determined by call instruction in the process of executing the instruction.

A command server identification device 10a according to a second embodiment will be explained below with reference to the drawing. In the following description, the same reference signs are assigned to those that execute the same processing as that of the first embodiment, and explanation thereof is omitted.

Figure 8:
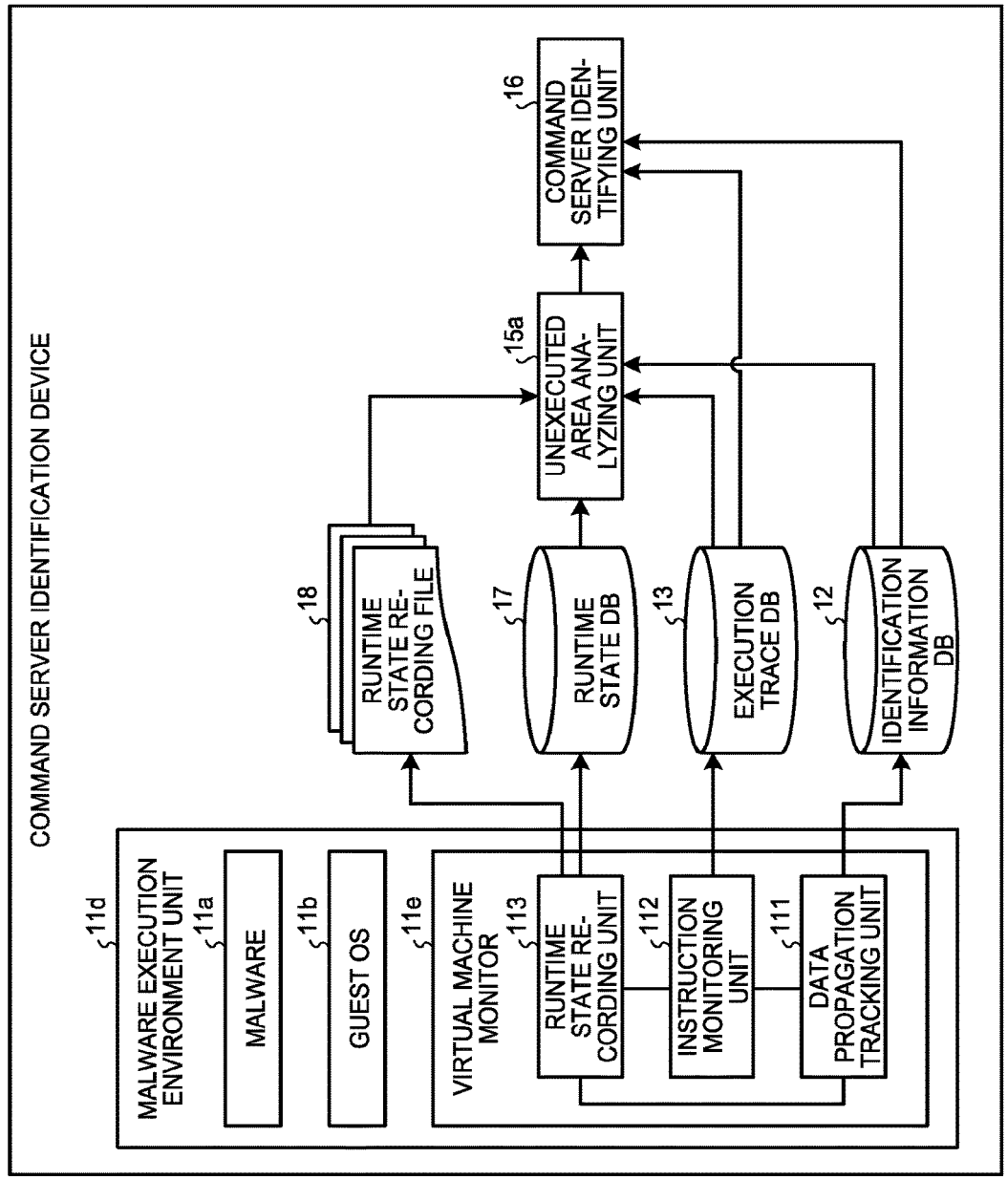
FIG. 8 is a block diagram illustrating an overview of a command server identification device according to a second embodiment.

A configuration of the command server identification device 10a will be explained first with reference to FIG. 8. FIG. 8 is a block diagram illustrating an overview of the command server identification device according to the second embodiment. In the example of FIG. 8, the command server identification device 10a includes a malware execution environment unit 11d, the identification information DB 12, the execution trace DB 13, a runtime state DB 17, a runtime state recording file 18, an unexecuted area analyzing unit 15a, and the command server identifying unit 16.

The malware execution environment unit 11d includes the malware 11a, the guest OS 11b, and a virtual machine monitor 11e, and analyzes the malware 11a while actually running, similarly to the malware execution environment unit 11.

The virtual machine monitor 11e includes the data propagation tracking unit 111, the instruction monitoring unit 112, and a runtime state recording unit 113, and monitors a runtime behavior of the malware 11a executed by a virtual machine operating on the guest OS 11b, similarly to the virtual machine monitor 11c.

Here, the runtime state recording unit 113 provided in the virtual machine monitor 11e records a snapshot of the virtual machine at the time of execution of malware. For example, the runtime state recording unit 113 acquires the snapshot of the virtual machine that executes the malware 11a, records the acquired snapshot as the runtime state recording file 18, and records the location where the snapshot is acquired in the runtime state DB 17.

The processing of acquiring snapshot by the runtime state recording unit 113 can be implemented by using a snapshot function generally provided in the virtual machine monitor 11e. However, there is generally no function of recording information for the tag added to data by the data propagation tracking unit 111 in order to track the data. Therefore, the runtime state recording unit 113 stores all the data within the memory area in which the tag is stored, in the runtime state recording file 18 together with the snapshot at the time of acquiring the snapshot. In general, because the snapshot can record a difference in all the states of the virtual machine including the memory content, it is possible to acquire more information than information in which the state of the virtual machine is recorded using the memory dump. In the following description, a combination of the snapshot of the virtual machine acquired by the data propagation tracking unit 111 and the data within the memory area in which the tag is stored is described as "snapshot".

Figure 9:
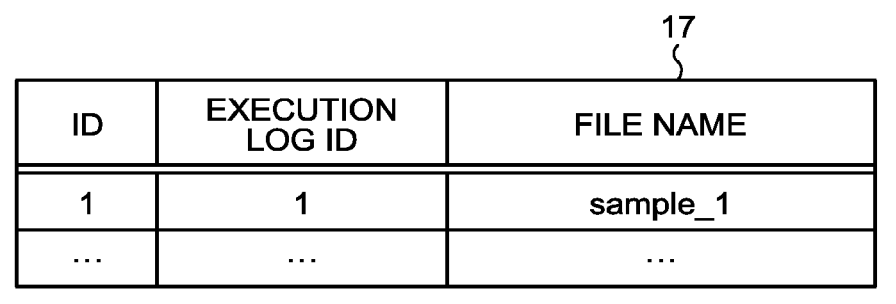

The runtime state DB 17 records the location where the snapshot acquired by the runtime state recording unit 113 is acquired. For example, FIG. 9 is a diagram illustrating an example of information stored by the runtime state DB according to the second embodiment. As illustrated in FIG. 9, the runtime state DB 17 stores an ID of snapshot, an execution log ID of the execution log corresponding to an instruction executed when the snapshot is acquired, and a file name in association with each other. Here, the file name is a title added to binary data of the snapshot recorded in the runtime state recording file 18, such as snapshot acquisition date.

Referring back to FIG. 8, the runtime state recording file 18 is the binary data of the snapshot acquired by the runtime state recording unit 113. The runtime state recording file 18 is recorded in a predetermined storage device included in the command server identification device 10a or a predetermined storage device included in an external device.

The unexecuted area analyzing unit 15a dynamically analyzes the API and the system call called in the unexecuted area not executed by the malware 11a, and the control structure. Specifically, the unexecuted area analyzing unit 15a acquires the branch instruction that the received data affects the determination of the branch destination from the execution trace DB 13, and determines whether each branch destination is executed.

Then, when there is an unexecuted branch destination, the unexecuted area analyzing unit 15a uses the snapshot recorded in the runtime state DB 17, restores the state at the time of executing the branch instruction, forcibly executes the unexecuted branch destination from the restored portion, and dynamically analyzes the API and the system call called at the unexecuted branch destination, and the control structure. For example, the unexecuted area analyzing unit 15a performs, from the restored portion, forcible execution of simply forcibly rewriting an instruction pointer register to an address of the branch destination, or forcibly executes the unexecuted branch destination by symbolic execution that symbolizes and executes the branch condition. The unexecuted area analyzing unit 15a dynamically analyzes the API and the system call called at the branch destination, and the control structure.

In either of the cases, because it is forcible execution, contest information does not match, so that there is a possibility that an analysis target program may end in error on the way. Therefore, when the program ends in error, the unexecuted area analyzing unit 15a notifies the command server identifying unit 16 of the information on API calls, system calls, and control structures acquired so far. In order to match the context information with each other, the unexecuted area analyzing unit 15a may generate input data based on constraint conditions with respect to the input value obtained by symbolic execution, and re-analyze the malware.

As a result of the processing, the command server identifying unit 16 identifies the command server based on the API and the system call called in the unexecuted area that is dynamically analyzed by the unexecuted area analyzing unit 15a, and based on the control structure. For example, when the predetermined API and system call or the predetermined API string or the like are called in the unexecuted area, the command server identifying unit 16 determines the transmission source of the data that affects the branch instruction as a target to be processed as the command server.

Processing Performed by Unexecuted Area Analyzing Unit

Figure 10:
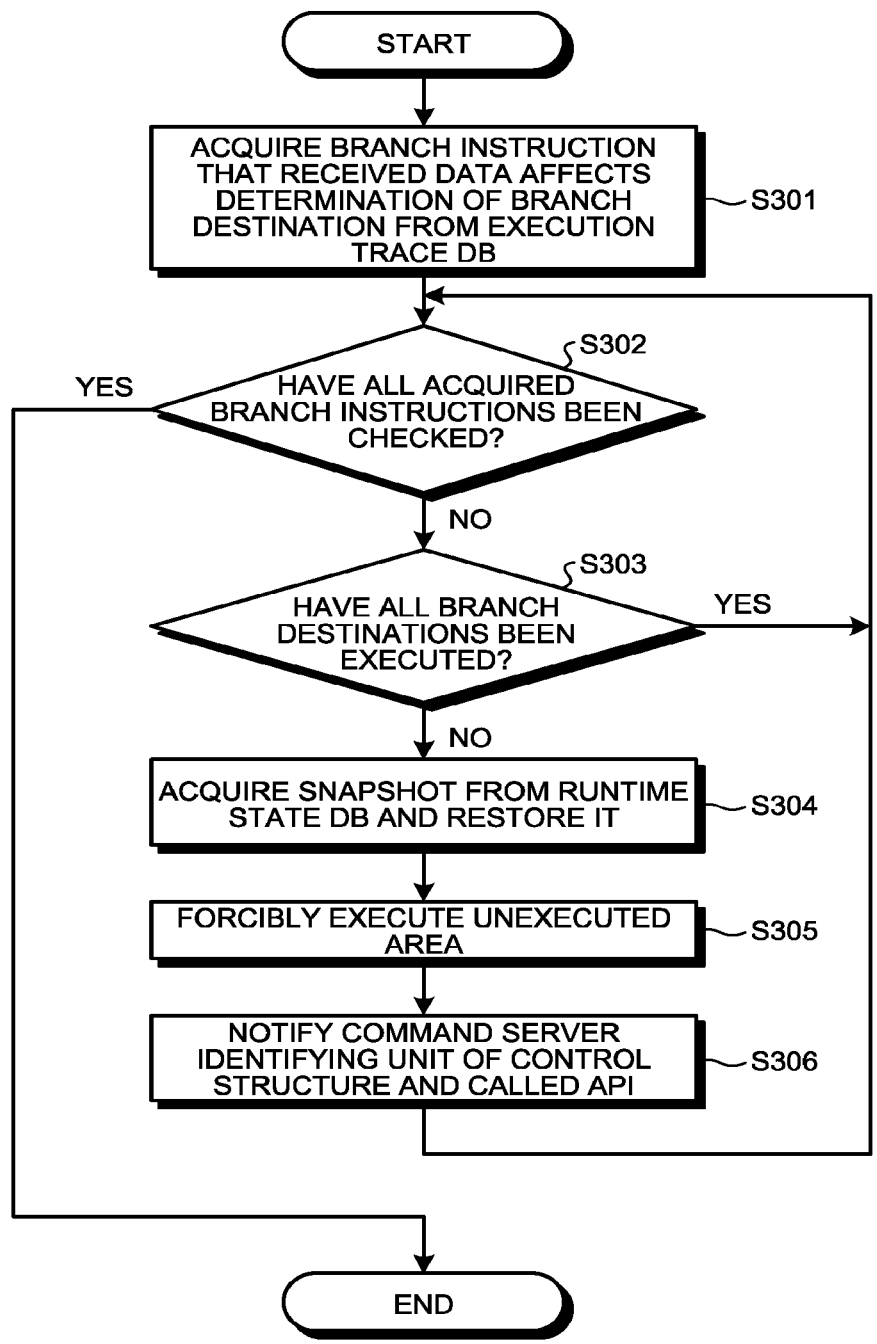
FIG. 10 is a flowchart illustrating a flow of processing for dynamic analysis of an unexecuted area by the command server identification device according to the second embodiment.

The processing performed by the command server identification device 10a according to the second embodiment will be explained next with reference to FIG. 10. FIG. 10 is a flowchart illustrating a flow of processing for dynamic analysis of an unexecuted area by the command server identification device according to the second embodiment. As illustrated in FIG. 10, the unexecuted area analyzing unit 15a acquires a branch instruction that the received data affects the determination of the branch destination, from the execution trace DB 13 (Step S301). Subsequently, the unexecuted area analyzing unit 15a determines whether all acquired branch instructions have been checked (Step S302), and determines, when they have not been checked (No at Step S302), whether all the branch destinations have been executed (Step S303).

When all the branch destinations have not been executed (No at Step S303), that is, when there is an unexecuted area, the unexecuted area analyzing unit 15a executes the following processing. First of all, the unexecuted area analyzing unit 15a refers to the runtime state DB 17, identifies the snapshot at the time of execution of the branch instruction as a target to be processed, and acquires the identified snapshot from the runtime state recording file 18 and restores the acquired snapshot (Step S304). Then, the unexecuted area analyzing unit 15a forcibly executes and dynamically analyzes the unexecuted area (Step S305). Thereafter, the unexecuted area analyzing unit 15a notifies the command server identifying unit 16 of the identified control structure and the API called in the unexecuted area (Step S306), and executes again Step S302. Meanwhile, when all the branch destinations have been executed (Yes at Step S303), the unexecuted area analyzing unit 15*a* executes again Step S302. When all the acquired branch instructions have been checked (Yes at Step S302), the unexecuted area analyzing unit 15*a* ends the processing.

Advantageous Effects of Second Embodiment

As explained above, the command server identification device 10*a* records the snapshot of the virtual machine that executes the malware 11*a*. Then, the command server identification device 10*a* uses the snapshot to forcibly execute the branch destination not executed by the malware 11*a* after the branch instruction, and dynamically analyzes the information on the instruction of the branch destination.

In other words, because the command server identification device 10*a* uses the snapshot of the virtual machine to dynamically analyze the branch destinations not executed by the malware 11*a*, there are cases where it is possible to identify the command server that cannot be identified by only the content of the memory dump. As a result, the command server identification device 10*a* can accurately identify the command server. However, because the command server identification device 10*a* uses the snapshot of the virtual machine, the storage capacity for storing various databases and the processing burden of analysis are increased as compared with the command server identification device 10.

Other Embodiments

Although the first embodiment and the second embodiment have been explained so far, the disclosed invention may be implemented by various embodiments other than the embodiments. Therefore, other embodiments will be explained below.

Method of Storing Memory Dump

The command server identification device 10 stores the acquired memory dump in a DB format in the memory dump DB 14. However, the embodiments are not limited thereto. For example, the command server identification device 10 may save the acquired memory dump in a binary format file and set the ID of the memory dump and the memory-dump acquisition date in the file name. In other words, the command server identification device 10 can record the memory dump in an arbitrary method.

About Taint Analysis

The command server identification devices 10 and 10*a* use the taint analysis to track data propagation. Here, in general, the taint analysis technology used to track data propagation has a problem such as discontinuity of data propagation. In order to alleviate this problem, the command server identification devices 10 and 10*a* may use a mechanism of forced propagation such as a method of propagating a tag to a return value from the argument of the function or a method of propagating a tag to the return value of a function in the function in which a specific tag is read and to a write content within the function.

System Configuration Etc.

In addition, the components of the illustrated devices are functionally conceptual, and are not necessarily configured as physically illustrated ones. In other words, the specific mode of decentralization and integration of the devices is not limited to the illustrated ones, and it may be configured by functionally or physically decentralizing or integrating all or part of the devices in an arbitrary unit according to various loads and usage conditions.

As an example, the data propagation tracking unit 111 and the instruction monitoring unit 112 may be integrated into one unit, or the virtual machine monitor 11*c* may be separated into a virtual machine and a monitor for monitoring the virtual machine. The identification information DB 12, the execution trace DB 13, and the memory dump DB 14 may be stored by an external device of the command server identification device 10, and these components may be connected to the command server identification device 10 via a network. Different devices have the unexecuted area analyzing unit 15 and the command server identifying unit 16 respectively, and the functions of the command server identification device 10 may be implemented by the devices connected to the network in cooperation with each other.

Furthermore, all or arbitrary part of the processing functions performed in each of the devices can be implemented by the CPU and by the program analyzed and executed by the CPU, or implemented as hardware by wired logic.

Of the processes explained in the present embodiment, all or part of the processes explained as automatically performed ones can be manually performed, or all or part of the processes explained as manually performed ones can be also automatically performed using known methods. In addition, the information including the procedures, the control procedures, the specific names, the various data, and the parameters illustrated in the documents and the drawings can be arbitrarily modified unless otherwise specified.

Program

It is also possible to create a program, for processing executed by the command server identification devices 10 and 10*a* explained in the embodiments, which is written in a computer-executable language. For example, for the processing executed by the command server identification device 10 according to the first embodiment, it is also possible to create an identification program written in a computer-executable language. In this case, by executing the identification program on the computer, it is possible to obtain the same advantageous effects as these of the first embodiment. Moreover, by recording the identification program in a recording medium that can read by a computer to read the identification program recorded in the recording medium into the computer and executing the read program, the same processing as that of the first embodiment may be implemented. An example of the computer for executing the identification program that implements the same functions as these of the command server identification device 10 illustrated in FIG. 1 will be explained below.

Figure 11:
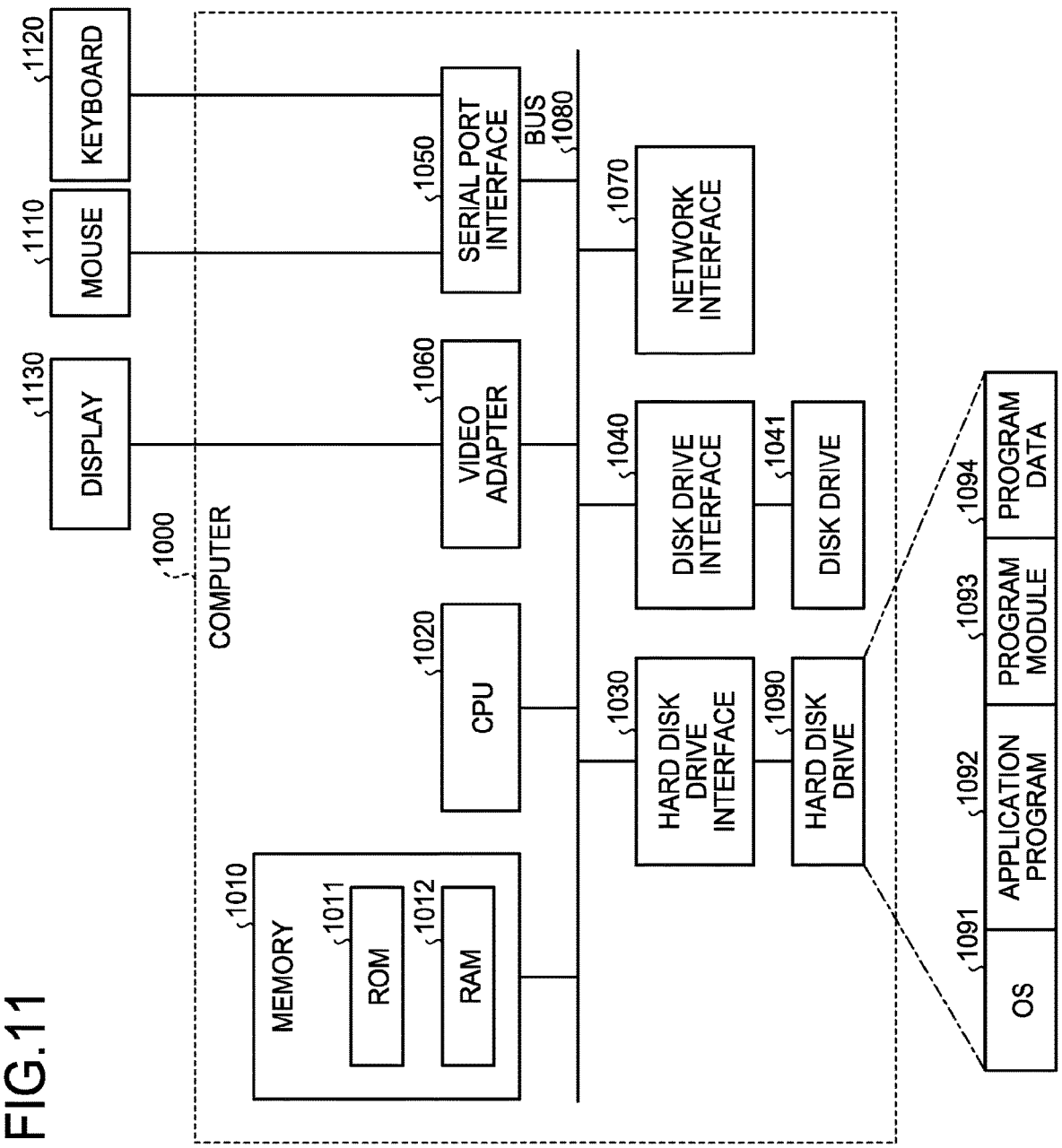
FIG. 11 is a diagram illustrating a computer that executes an identification program.

FIG. 11 is a diagram illustrating a computer that executes an identification program. A computer 1000 includes, for example, a memory 1010, a CPU 1020, a hard disk drive interface 1030, a disk drive interface 1040, a serial port interface 1050, a video adapter 1060, and a network interface 1070, which are connected to each other via a bus 1080.

As illustrated in FIG. 11, the memory 1010 includes ROM (Read Only Memory) 1011 and RAM (Random Access Memory) 1012. The Rom 1011 stores, for example, a boot program such as BIOS (Basic Input Output System). The hard disk drive interface 1030 is connected to a hard disk drive 1090 as illustrated in FIG. 11. The disk drive interface 1040 is connected to a disk drive 1041 as illustrated in FIG. 11. For example, a removable storage medium such as a magnetic disk and an optical disk is inserted in the disk drive. The serial port interface 1050 is connected to, for example, a mouse 1110 and a keyboard 1120 as illustrated in FIG. 11. The video adapter 1060 is connected to, for example, a display 1130 as illustrated in FIG. 11.

Here, as illustrated in FIG. 11, the hard disk drive 1090 stores, for example, an OS 1091, an application program 1092, a program module 1093, and program data 1094. In other words, the identification program is stored in, for example, the hard disk drive 1090 as a program module in which commands executed by the computer 1000 are written.

The various data explained in the embodiments are stored as program data in, for example, the memory 1010 and the hard disk drive 1090. The CPU 1020 loads the program module 1093 or the program data 1094 stored in the memory 1010 or the hard disk drive 1090 into the RAM 1012 as needed, and executes a tracking step, an analyzing step, and an identifying step.

The program module 1093 and the program data 1094 according to the identification program are not limited to the case where both are stored in the hard disk drive 1090, and may be stored in, for example, a removable storage medium and read by the CPU 1020 via the disk drive etc. Alternatively, the program module 1093 and the program data 1094 according to the identification program may be stored in other computer connected thereto via a network (LAN (Local Area Network) and WAN (Wide Area Network) etc.) and read by the CPU 1020 via the network interface 1070.

Although some embodiments have been explained so far, the technology disclosed by the present application is not limited to the embodiments. In other words, these embodiments can be implemented in various other forms, and it is possible to perform various omissions, substitutions, and modifications.

The embodiments and modifications thereof are included in the technology disclosed in the present application and also included in the invention described in the scope of the appended claims and in the range of equivalents thereof.

REFERENCE SIGNS LIST 10, 10a COMMAND SERVER IDENTIFICATION DEVICE
11, 11d MALWARE EXECUTION ENVIRONMENT UNIT
11a MALWARE
11b GUEST OS
11c, 11e VIRTUAL MACHINE MONITOR
110 MEMORY DUMP ACQUIRING UNIT
111 DATA PROPAGATION TRACKING UNIT
112 INSTRUCTION MONITORING UNIT
113 RUNTIME STATE RECORDING UNIT
12 IDENTIFICATION INFORMATION DB
13 EXECUTION TRACE DB
14 MEMORY DUMP DB
15, 15a UNEXECUTED AREA ANALYZING UNIT
16 COMMAND SERVER IDENTIFYING UNIT
17 RUNTIME STATE DB
18 RUNTIME STATE RECORDING FILE

The invention claimed is:

1. An identification device comprising:
processing circuitry configured to:
add a tag to data received by malware upon execution of the malware, the tag capable of uniquely identifying identification information for a transmission source of the data, and track propagation of the data added with the tag;
acquire a tag of data referenced by a branch instruction executed by the malware, among the tracked data;
analyze information on an instruction of a branch destination not executed by the malware after the branch instruction to generate an analysis result; and
identify identification information of a command server for issuing a command to the malware from the identification information of the transmission source corresponding to the tag acquired, based on the analysis result,
wherein the processing circuitry is further configured to:
record a snapshot of a virtual machine that executes the malware in the runtime state,
use the recorded snapshot, restore a state at a time of executing the branch destination, and
forcibly execute the branch destination not executed by the malware after the branch instruction,
determine the identification information of the transmission source of the data referenced by forcibly executing the branch destination, as the identification information of the command server,
dynamically analyze at least one of an Application Programming Interface (API) and a system called at the unexecuted branch destination,
based on the API and system call called in the unexecuted area that is dynamically analyzed, determine the identification information of the transmission source corresponding to the tag of the data referenced by the branch instruction, as the identification information of the command server, and
add the identification information of the command server to a blacklist which enables blocking communication with the command server, and finding and isolating an infected terminal.

2. The identification device according to claim 1, wherein when predetermined APIs are called in a predetermined order at the branch destination not executed by the malware after the branch instruction, or when predetermined system calls are called in a predetermined order,
the processing circuitry is configured to determine the identification information of the transmission source corresponding to the tag of the data referenced by the branch instruction, as the identification information of the command server.

3. The identification device according to claim 1, wherein the processing circuitry identifies an API called between the branch point and the junction, and determines whether a predetermined API or a predetermined API string is included in the identified API, and
when a predetermined API or a predetermined API string is included in the identified API, the processing circuitry determines the identification information of the transmission source corresponding to the tag of the data referenced by the branch instruction, as the identification information of the command server.

4. An identification method executed by an identification device, the identification method comprising:
adding a tag to data received by malware upon execution of the malware, the tag capable of uniquely identifying identification information for a transmission source of the data, and track propagation of the data added with the tag;
acquiring a tag of data referenced by a branch instruction executed by the malware, among the tracked data;
analyzing information on an instruction of a branch destination not executed by the malware after the branch instruction to generate an analysis result; and
identifying identification information of a command server for issuing a command to the malware from the identification information of the transmission source corresponding to the tag acquired, based on the analysis result, wherein the method further comprises:
recording a snapshot of a virtual machine that executes the malware in the runtime state,
using the recorded snapshot, restore a state at a time of executing the branch destination, and
forcibly executing the branch destination not executed by the malware after the branch instruction,
determining the identification information of the transmission source of the data referenced by forcibly executing the branch destination, as the identification information of the command server,
dynamically analyzing at least one of an Application Programming Interface (API) and a system called at the unexecuted branch destination,
based on the API and system call called in the unexecuted area that is dynamically analyzed, determining the identification information of the transmission source corresponding to the tag of the data referenced by the branch instruction, as the identification information of the command server, and
adding the identification information of the command server to a blacklist which enables blocking communication with the command server, and finding and isolating an infected terminal.

5. A non-transitory computer-readable recording medium having stored an identification program for causing a computer to execute a process comprising:
adding a tag to data received by malware upon execution of the malware, the tag capable of uniquely identifying identification information for a transmission source of the data, and track propagation of the data added with the tag;
acquiring a tag of data referenced by a branch instruction executed by the malware, among the tracked data;
analyzing information on an instruction of a branch destination not executed by the malware after the branch instruction to generate an analysis result; and
identifying identification information of a command server for issuing a command to the malware from the identification information of the transmission source corresponding to the tag acquired, based on the analysis result, wherein the process further comprises:
recording a snapshot of a virtual machine that executes the malware in the runtime state,
using the recorded snapshot, restore a state at a time of executing the branch destination, and
forcibly executing the branch destination not executed by the malware after the branch instruction,
determining the identification information of the transmission source of the data referenced by forcibly executing the branch destination, as the identification information of the command server,
dynamically analyzing at least one of an Application Programming Interface (API) and a system called at the unexecuted branch destination,
based on the API and system call called in the unexecuted area that is dynamically analyzed, determining the identification information of the transmission source corresponding to the tag of the data referenced by the branch instruction, as the identification information of the command server, and
adding the identification information of the command server to a blacklist which enables blocking communication with the command server, and finding and isolating an infected terminal.

* * * * *